United States Patent
Sugiyama

(10) Patent No.: US 8,745,756 B2
(45) Date of Patent: Jun. 3, 2014

(54) DEVICE MANAGEMENT SYSTEM, DEVICE MANAGEMENT APPARATUS, DEVICE MANAGEMENT METHOD, PROGRAM FOR IMPLEMENTING THE METHOD, AND STORAGE MEDIUM STORING THE PROGRAM

(75) Inventor: Hideki Sugiyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 976 days.

(21) Appl. No.: 11/755,230

(22) Filed: May 30, 2007

(65) Prior Publication Data

US 2007/0283414 A1 Dec. 6, 2007

(30) Foreign Application Priority Data

May 31, 2006 (JP) .................................. 2006-152266

(51) Int. Cl.
*G06F 21/00* (2013.01)
*G06F 21/60* (2013.01)
*G06F 21/31* (2013.01)

(52) U.S. Cl.
CPC .............. *G06F 21/608* (2013.01); *G06F 21/31* (2013.01)
USPC ......................................................... 726/28

(58) Field of Classification Search
USPC ............................... 713/165–167; 726/26–29
See application file for complete search history.

(56) References Cited

U.S. PATENT DOCUMENTS

| 6,202,066 B1 * | 3/2001 | Barkley et al. ................. 707/785 |
| 7,266,590 B2 * | 9/2007 | Nakaoka et al. ............... 709/219 |
| 2003/0226015 A1 * | 12/2003 | Neufeld et al. ............... 713/166 |

FOREIGN PATENT DOCUMENTS

JP 2002-202945 A 7/2002

* cited by examiner

*Primary Examiner* — Benjamin Lanier
(74) *Attorney, Agent, or Firm* — Rossi, Kimms & McDowell, LLP

(57) ABSTRACT

A device management system which makes it possible to promptly and easily change and reset device-related operation rights assigned to users. User's operation rights with respect to a device are set, and a system policy is set which is used to restrict the operation rights with respect to the device and is to be applied to a plurality of specific users. It is determined whether or not the system policy is to be applied. If it is determined that the system policy is to be applied, the user's operation rights with respect to the device are restricted based on the system policy irrespective of whether or not operation rights have been set.

12 Claims, 15 Drawing Sheets

| USER | GROUP | ROLE | COLOR | N in 1 | ONE-SIDED |
|------|-------|------|-------|--------|-----------|
| USERA | GROUP1 | ADMINNISTRATOR | PERMITTED | 1 | PERMITTED |
| USERB | GROUP2 | POWERUSER | PERMITTED | 1 | PERMITTED |
| USERC | GROUP3 | DEVELOPER | NOT PERMITTED | 2 | NOT PERMITTED |
| USERD | GROUP4 | DESIGNER | PERMITTED | 2 | NOT PERMITTED |
| USERE | : | : | : | : | : |
| : | DEFAULT | DEFAULT | NOT PERMITTED | 4 | NOT PERMITTED |

FIG. 7

```xml
<?xml version=" 1.0" encoding=" UTF-8" ?>
<ACT xmlns:xsi=" http://WWW.W3.org/2001/XMLSchema-instance" >
    <Version>0</Version>
    <UserInfo>
        <UserName>Taro</UserName>
        <BaseRole>PowerUser</BaseRole>
        <UserEmail>taro@xxx.yyy</UserEmail>
    </UserInfo>
    <DeviceInfo>
        <PrintSecurityLevel>0</PrintSecurityLevel>
    </DeviceInfo>
    <DeviceAccessControl>
    <AttributeCategory Name=" DeviceCapabilityRestriction" CategoryStatus=" Static" >
        <saml:AttributeStatement>
            <saml:Attribute Name=" PdlPrint" >
                <saml:AttributeValue Name=" PdlPrintFlag" >Permit</saml:AttributeValue>
                <saml:AttributeValue Name=" ColorPrint" >Color</saml:AttributeValue>
                <saml:AttributeValue Name=" Simplex" >Deny</saml:AttributeValue>
            </saml:Attribute>
        </saml:AttributeStatement>
    </AttributeCategory>
    <AttributeCategory name=" QuotaRestriction" CategoryStatus=" Dynamic" >
        <saml:AttributeStatement>
            <saml:Attribute name=" Print" >
                <saml:AttributeValue Name=" ColorPrintTotal" >1000</saml:AttributeValue>
                <saml:AttributeValue Name=" BwPrintTotal" >1000</saml:AttributeValue>
            </saml:Attribute>
        </saml:AttributeStatement>
    </AttributeCategory>
    </DeviceAccessControl>
</ACT>
```

701, 702, 703

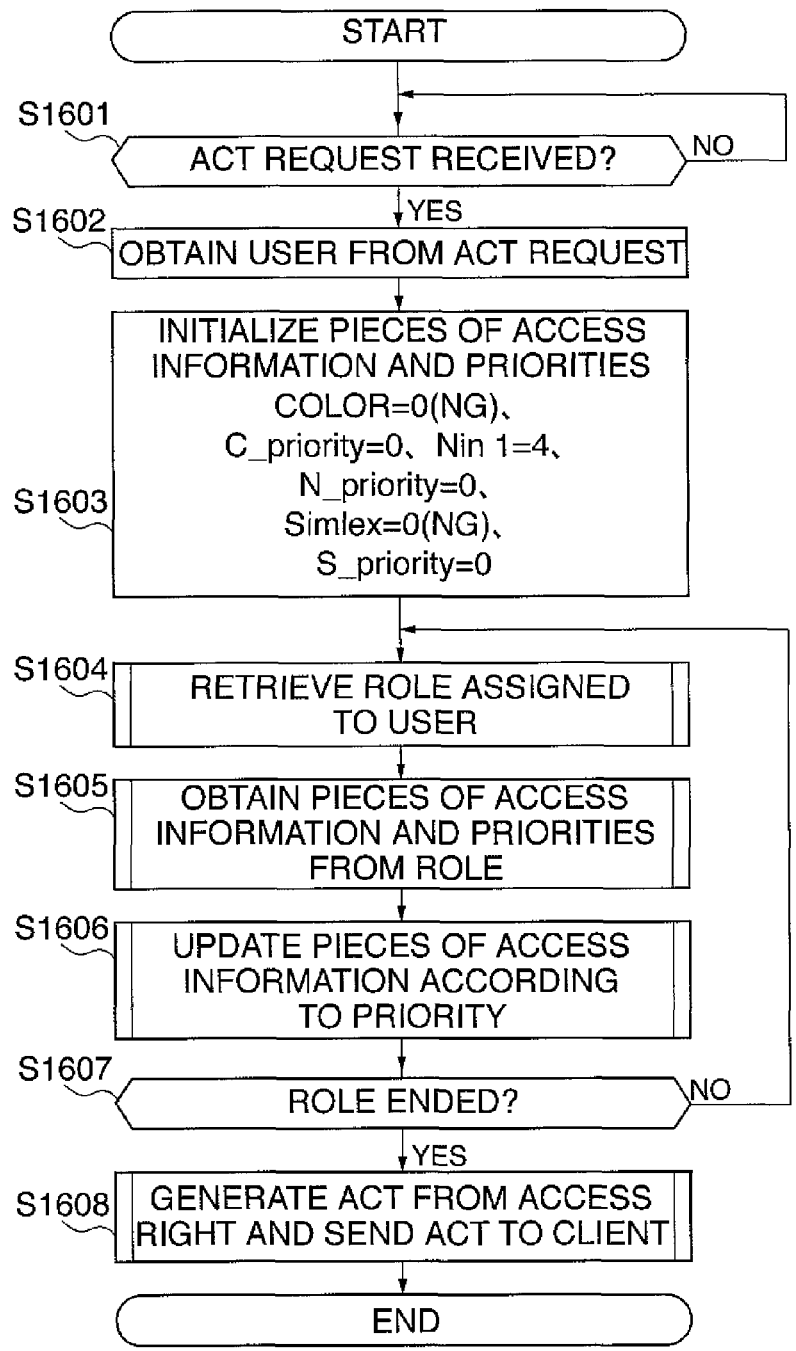

DEVICE MANAGEMENT SYSTEM, DEVICE MANAGEMENT APPARATUS, DEVICE MANAGEMENT METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a device management system, a device management apparatus, a device management method, a program for implementing the method, and a storage medium storing the program.

2. Description of the Related Art

Some recent copying machines have a function of printing print jobs from an external client, a function of sending read originals to an external apparatus by electronic mail or file transfer, and so on, as well as a function of copying originals. Such copying machines with a plurality of functions are generally referred to as MFPs (multi function peripherals).

If apparatuses such as the above-mentioned MFPs have a function of sending read information to an external apparatus, they have an increased risk of leaking information. Accordingly, it is becoming increasingly important to manage e.g. the usage of MFPs by users.

To prevent information leakage, it has been desired to impose restrictions on the usage of various functions by users or user groups (hereinafter collectively referred to as users). In particular, in a case where many users share an MFP, which has many functions, it is desirable that restrictions be imposed according to combinations of users and MFP's functions.

To cope with such a case, there has been proposed a method of preparing roles in which restriction information is set with respect to various operations, and assigning roles to users to thereby impose restrictions on user's operations (see e.g. Japanese Laid-Open Patent Publication (Kokai) No. 2002-202945). Also, there has been proposed a method of preparing a plurality of roles, and interchanging roles or assigning a plurality of roles to a user at a time so as to impose restrictions on user's operations.

For example, assume that business conditions become worse or the level of security is temporarily raised in a company where MFPs are used for business. In such a case, specific restrictions are imposed, e.g. the usage of certain functions of the MFPs is prohibited for a predetermined period of time, or users permitted to operate the MFPs are restricted for a predetermined period of time.

However, to impose such specific restrictions, it is necessary to reedit MFP operation rights written in roles assigned to target users, which requires a large number of man-hours and a large amount of time. As a result, extra costs are required. Similarly, when the specific restrictions are removed to reset the original restrictions after the lapse of a predetermined period of time, it is necessary to reedit MFP operation rights written in roles, and as a result, extra costs are required.

For example, if a certain role is assigned to a plurality of users, a change in the role affects not only users whose rights are desired to be restricted but also other users. Also, if a plurality of users are assigned to a user whose right is desired to be restricted, a change in only one role may not affect user's rights depending on final right calculation rules used in a case where a plurality of roles are assigned to a user. For example, if a role A and a role B that permit "Color Printing" are assigned to a user, "Color Printing" is permitted if permission takes priority according to final right calculation rules. That is, even if the role A is changed to prohibit "Color Printing", permission by the role B takes priority according to the final right calculation rule. Thus, the plurality of roles have to be changed.

If the number of users, the number of roles, and the number of functions to be restricted using the roles, which are managed by the system, are increased, a large number of changes have to be made, which requires a large amount of time. Also, there may be a case where the number of errors such as forgetting to make changes increases, making it impossible to impose desired restrictions.

SUMMARY OF THE INVENTION

The present invention provides a device management system, a device management apparatus, and a device management method which make it possible to promptly and easily change and reset device-related operation rights assigned to users, as well as a program for implementing the method, and a storage medium storing the program.

In a first aspect of the present invention, there is provided a device management system that manages at least one device, comprising an operation right setting unit adapted to set user's operation rights with respect to the device, a restrictive specification setting unit adapted to set a restrictive specification for restricting the operation rights with respect to the device, the restrictive specification being intended to be applied to a plurality of specific users, a determination unit adapted to determine whether the restrictive specification is to be applied, and an operation right restricting unit adapted to restrict the user's operation rights with respect to the device based on the restrictive specification irrespective of whether operation rights have been set by the operation right setting means when it is determined that the restrictive specification is to be applied.

In a second aspect of the present invention, there is provided a device management apparatus that manages at least one device, comprising an operation right setting unit adapted to set user's operation rights with respect to the device, a restrictive specification setting unit adapted to set a restrictive specification for restricting the operation rights with respect to the device, the restrictive specification being intended to be applied to a plurality of specific users, a determination unit adapted to determine whether the restrictive specification is to be applied, and an operation right restricting unit adapted to restrict the user's operation rights with respect to the device based on the restrictive specification irrespective of whether operation rights have been set by the operation right setting means when it is determined that the restrictive specification is to be applied.

The device management apparatus can further comprise a user designating unit adapted to designate users to which the restrictive specification is to be applied.

The restrictive specification can be adapted to designate users whose device-operated operation rights are given priority.

The device management apparatus can further comprise a holding unit adapted to hold a plurality of tables in which device-related operation rights and priorities associated therewith assigned to respective users are written and a priority changing unit adapted to change the priorities associated with the operation rights in the plurality of tables. In setting operation rights of a user who requests operation of the device, the operation right setting unit refers to the table assigned to the user to set operation rights with high priorities as the operation rights of the user who requests operation of the device.

In a case where it is determined that the restrictive specification is to be applied, the operation right restricting unit can issue a device usage permission including user's operation rights right with respect to the device restricted based on the restrictive specification.

In a third aspect of the present invention, there is provided a device management method of managing at least one device, comprising an operation right setting step of setting user's operation rights with respect to the device, a restrictive specification setting step of setting a restrictive specification for restricting the operation rights with respect to the device, the restrictive specification being intended to be applied to a plurality of specific users, a determination step of determining whether the restrictive specification is to be applied, and an operation right restricting step of restricting the user's operation rights with respect to the device based on the restrictive specification irrespective of whether operation rights have been set in the operation right setting step when it is determined that the restrictive specification is to be applied.

The device management method can further comprise a user designating step of designating users to which the restrictive specification is to be applied.

The restrictive specification can be adapted to designate users whose device-operated operation rights are given priority.

The device management apparatus can further comprise a holding step of holding a plurality of tables in which device-related operation rights and priorities associated therewith assigned to respective users are written and a priority changing step of changing the priorities associated with the operation rights in the plurality of tables. In the operation right setting step, in setting operation rights of a user who requests operation of the device, operation rights with high priorities are set as the operation rights of the user who requests operation of the device by referring to the table assigned to the user.

In the operation right restricting unit, in a case where it is determined that the restrictive specification is to be applied, a device usage permission including user's operation rights right with respect to the device restricted based on the restrictive specification can be issued.

In a fourth aspect of the present invention, there is provided a program for causing a computer to execute a device management method of managing at least one device, comprising an operation right setting module for setting user's operation rights with respect to the device, a restrictive specification setting module for setting a restrictive specification for restricting the operation rights with respect to the device, the restrictive specification being intended to be applied to a plurality of specific users, a determination module for determining whether the restrictive specification is to be applied, and an operation right restricting module for restricting the user's operation rights with respect to the device based on the restrictive specification irrespective of whether operation rights have been set by the operation right setting module when it is determined that the restrictive specification is to be applied.

In a fifth aspect of the present invention, there is provided a computer-readable storage medium storing a program according to the above mentioned program.

According to the present invention, a device-related operation right assigned to each user can be promptly and easily changed and reset.

Further features of the invention will become apparent from the following detailed description of exemplary embodiments with reference to the attached drawings.

BRIEF DESCRIPTION OF THE DRAWINGS

FIG. 7 is a diagram showing an example of contents of an ACT;

FIG. 15 is a flow chart showing the procedure of a process carried out by a ticketing server of the device management system according to the third embodiment.

DETAILED DESCRIPTION OF THE PREFERRED EMBODIMENTS

The present invention will now be described in detail with reference to the drawings showing preferred embodiments thereof.

Figure 1:
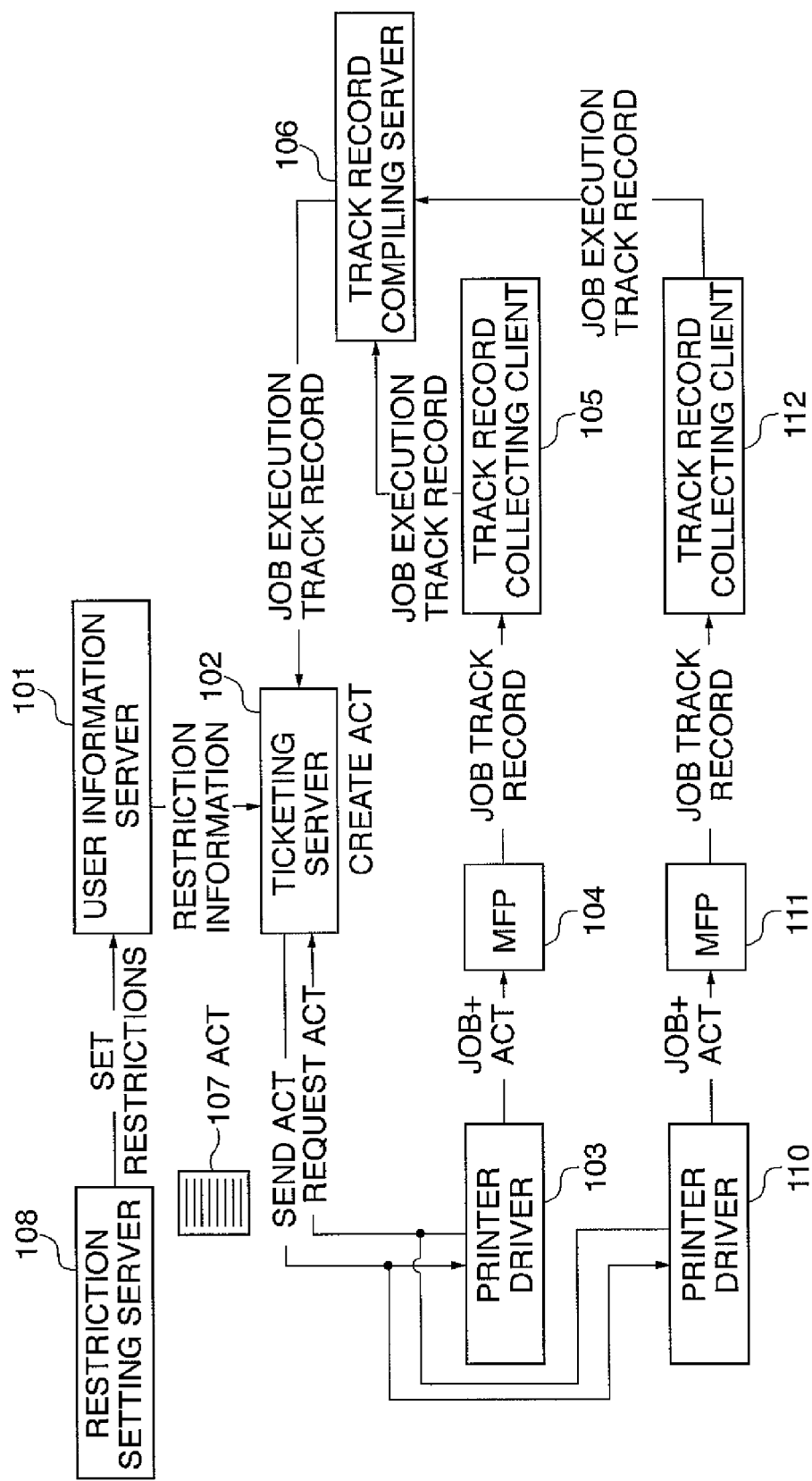
FIG. 1 is a block diagram schematically showing the construction of a device management system according to a first embodiment of the present invention.
Figure 2:
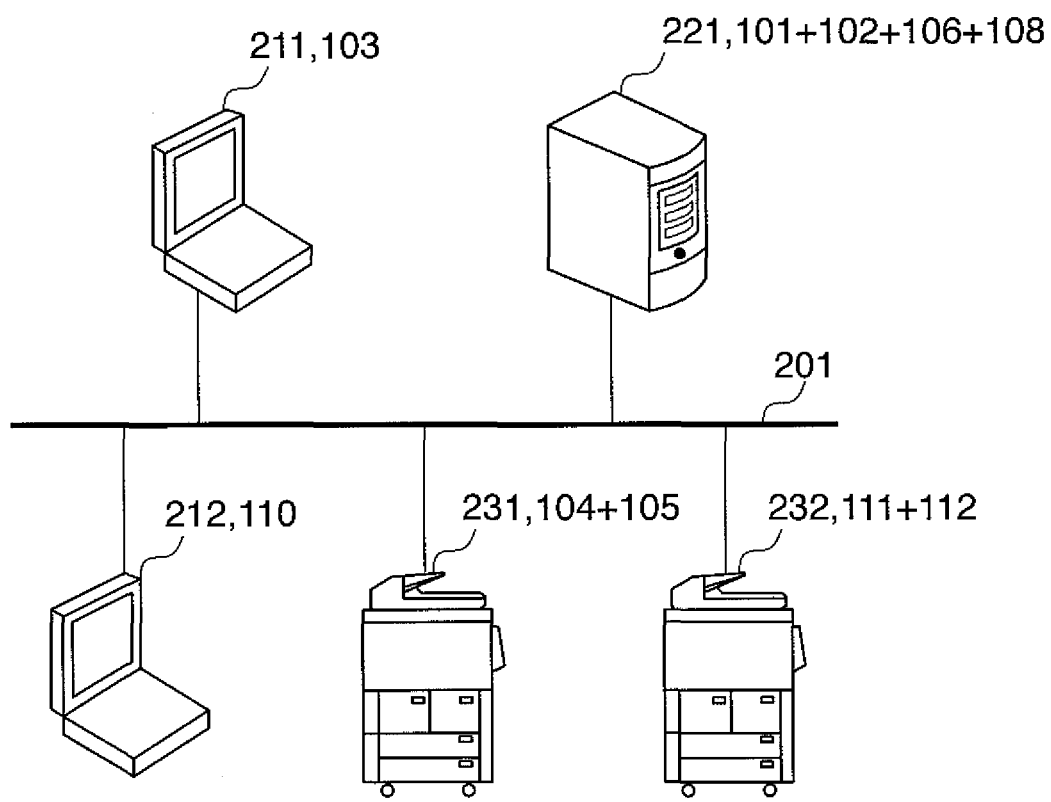
FIG. 2 is a conceptual diagram showing connections among a plurality of devices constituting the device management system of FIG. 1.

FIG. 1 is a block diagram schematically showing the construction of a device management system according to a first embodiment of the present invention. FIG. 2 is a conceptual diagram showing connections among a plurality of devices constituting the device management system of FIG. 1.

As shown in FIG. 1, the device management system is intended to manage the usage of MFPs 104 and 111. To manage the MFPs 104 and 111, a user information server 101, a ticketing server 102, a track record compiling server 106, and a restriction setting server 108 are used.

The user information server 101 stores IDs and passwords of respective users, roles assigned to the respective users, combinations of user IDs and roles assigned thereto, and a system policy. Here, the "role" means a collection of information on functional restrictions such as information indicative of which function is permitted or not permitted to be used and information indicative of the range of set values that can be used for each function. The user information server 101 is implemented by, for example, an LDAP (Lightweight Directory Access Protocol) server or an active directory server.

The ticketing server 102 issues a ticket 107 by referring to a role of a concerned user in the user information server 101 and job execution track records of the user. The ticket is called an access control token (ACT) in which information about functions permitted to be used and an upper limit to the number of copies are written. In the following description, the ticket will be referred to as "the ACT."

The ACT 107 issued as above is sent to printer drivers 103 and 110 which operate on respective client PCs, not shown. To use the PCs on which the respective printer drivers 103 and 110 operate, users have to log in to the PCs so that they can be identified. Each of the printer drivers 103 and 110 sends an ACT request to the ticketing server 102. When the ACT 107 is sent from the ticketing server 102 in response to the ACT request, the printer drivers 103 and 110 adds the received ACT 107 to a print job and sends the print job to the MFPs 104 and 111, respectively. That is, the ACT 107 is sent from the ticketing server 102 to the MFPs 104 and 111 via the printer drivers 103 and 110, respectively.

Each of the MFPs 104 and 111 has a plurality of functions. Specifically, each of the MFPs 104 and 111 has a copy function of copying originals, a printer function of printing print data sent from the printer drivers 103 and 110, and a sending function (SEND function). The sending function is a function of reading originals and sending image data thereof to an external file server or a mail address.

The MFPs 104 and 111 have track record collecting clients 105 and 112, respectively, incorporated therein. The track record collecting clients 105 and 112 operate on the corresponding MFPs 104 and 111, respectively. The track record collecting clients 105 and 112 collect job execution track records of respective users from the corresponding MFPs 104 and 111, respectively, and notify the track record compiling server 106 of the collected job execution track records. Although in the present embodiment, one MEP has one track record collecting client incorporated therein, one track record collecting client may collect job execution track records of respective users from a plurality of MFPs. Here, job execution track records mean track records of the number of printed sheets.

The track record compiling server 106 compiles job execution track records of individual users, which are supplied from the track record collecting clients 105 and 112, on a user-by-user basis. The job execution track records thus compiled on a user-by-user basis are sent to the ticketing server 102.

The restriction setting server 108 is comprised of a setting means, not shown, for setting roles to be stored in the user information server 101 and restriction information specified in the roles, assigning the roles with respect to users, and setting system information. Such information is set by an administrator using the setting means.

Next, a description will be given of a sequence from the creation of a job to compilation of track records. In the following description, it is assumed that the printer driver 103 creates a job.

(1) First, the printer driver 103 sends the ticketing server 102 an ACT request to which identification information on a user who is going to issue a job is attached.

(2) The ticketing server 102 acquires a role corresponding to the user who is trying to issue a job from among a plurality of roles stored in the user information server 101.

(3) The ticketing server 102 further acquires job execution track records corresponding to the user, who has requested an ACT, from the track record compiling server 106.

(4) The ticketing server 102 determines settings of a job which should be permitted for the user based on the acquired role and job execution track records.

(5) The ticketing server 102 generates an ACT 107 that reflects the settings of the job and adds an electronic signature for certifying that the ticketing server 102 has issued the ACT 107 to the ACT 107. The ACT 107 is then sent to the printer driver 103.

(6) The printer driver 103 sends the job and the ACT 107 to the MFP 104. The MFP 104 performs printing in accordance with the received job and ACT 104.

(7) The track record collecting client 105 collects track records of the user who has requested the MFP 104 to execute the job.

(8) The track record collecting client 105 sends the collected track records to the track record compiling server 106.

The device management system described above is comprised of MFPs 231 and 232, a server 221, and client PCs 211 and 212, which are connected to one another via a LAN 201. This device management system is applied to a printing management system that imposes restrictions on access by users of the MFPs 231 and 232 and imposes restrictions on job execution such as a restriction on the number of printed sheets.

Here, it is assumed that the users include personal users, divisions, and organizations. The MFPs 231 and 232 include the MFPs 104 and 111, respectively, appearing in FIG. 1 and the track record collecting clients 105 and 112, respectively, appearing in FIG. 1. Also, the server 221 is comprised of the user information server 101, the ticketing server 102, the track record compiling server 106, and the restriction setting server 108 appearing in FIG. 1. The server 221 constitutes a device management device that manages at least one device, that is, the MFP 231 or 232. The client PCs 211 and 212 include the printer drivers 103 and 110, respectively, appearing in FIG. 1.

The above described arrangement is just an example, and in place of the above described arrangement, components other than the MFPs 104 and 111 appearing in FIG. 1, that is, the track record collecting clients 105 and 112, the ticketing server 102, and the printer drivers 103 and 110 may be each comprised of client computers. Also, they may be comprised of several server computers. In this case, an interface between the printer driver 103 and the ticketing server 102 may be implemented by a physical communication medium such as a CPU bus, or a logic interface for message communication, which is configured like software. An interface between the ticketing server 102 and the track record compiling server 106, and an interface between the ticketing server 102 and the user information server 101 may be configured in a similar manner to the interface between the printer driver 103 and the ticketing server 102. Also, an interface between the track record collecting client 105 and the track record compiling server 106 may be configured in a similar manner to the interface between the printer driver 103 and the ticketing server 102. The above-mentioned functional blocks may be implemented by software realized by executing programs from a CPU or a hardware circuit.

Figure 3:
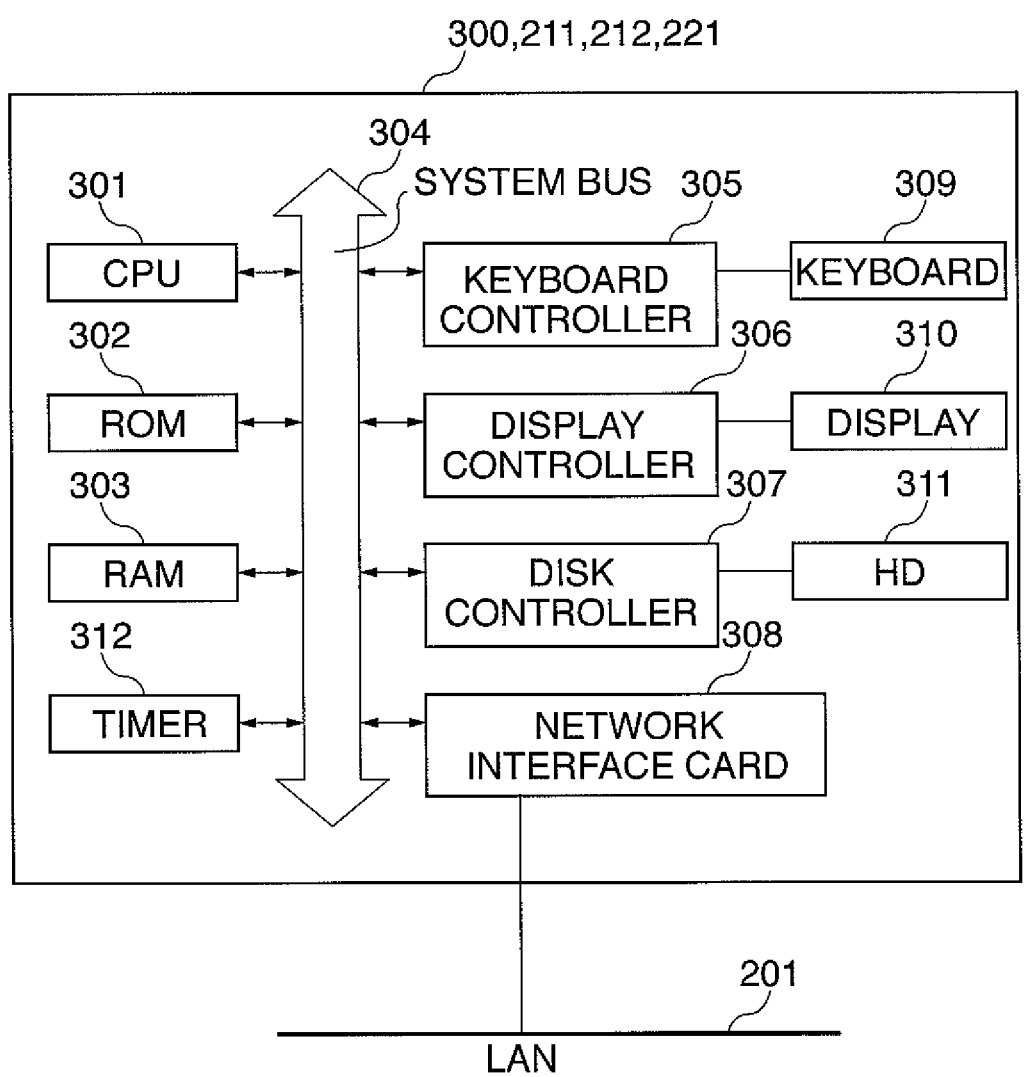
FIG. 3 is a block diagram showing the internal construction of client PCs and a server appearing in FIG. 2.

A description will now be given of the internal construction of the client PCs 211 and 212 and the server 221. FIG. 3 is a block diagram showing the internal construction of the client PCs 211 and 212 and the server 221. Here, a description will be given of the internal construction of a PC (personal computer) 300 which represents the client PCs 211 and 212 and the server 221.

As shown in FIG. 3, the PC 300 is comprised of a CPU 301 that executes programs stored in a ROM 302 or a hard disk (hereinafter referred to as "the HD") 311 and collectively controls devices connected to a system bus 304. The devices connected to the system bus 304 are the CPU 301, the ROM 302, a RAM 303, a keyboard controller 305, a display controller 306, a disk controller 307, a network interface card 308, and a timer 312. A keyboard 309, a display 310, and the HD 311 are connected to the keyboard controller 305, the display controller 306, and the disk controller 307, respectively.

The RAM 303 functions as a main memory, a working area, and so on for the CPU 301. The keyboard controller 305 forwards key codes, which are input from the keyboard 309, to the CPU 301 via the system bus 304. The display controller 306 controls display on the display 310 comprised of, for example, a liquid crystal display. The disk controller 307 controls writing or reading of data to and from the HD 311. The network interface card 308 bidirectionally sends and receives data to and from the other devices via the LAN 201.

Figure 4:
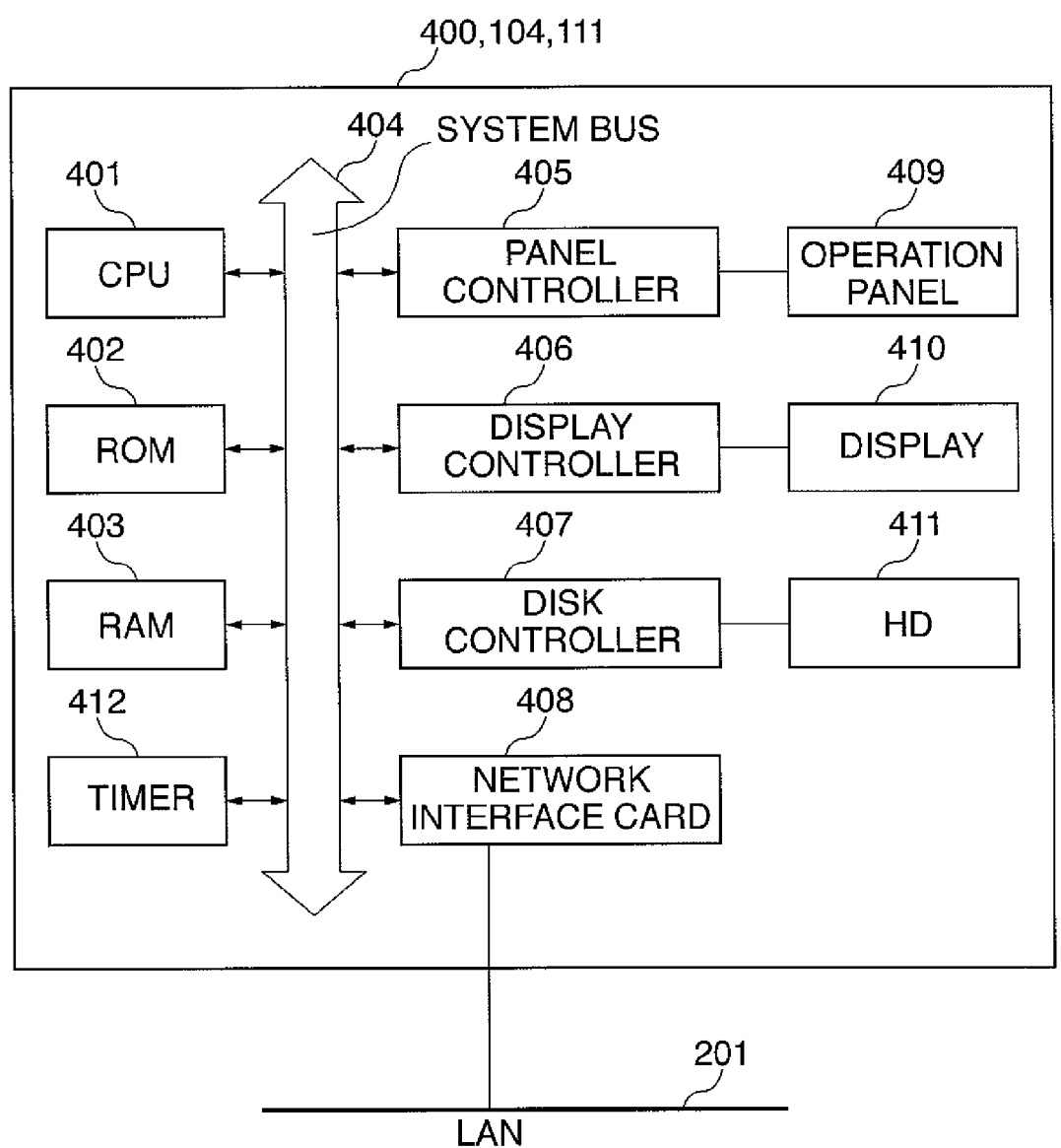
FIG. 4 is a block diagram showing the internal construction of an MFP appearing in FIG. 2.

Next, a description will be given of the internal construction of the MFPs 231 and 232 (104 and 111) with reference to FIG. 4. FIG. 4 is a block diagram showing the internal construction of the MFPs 231 and 232 appearing in FIG. 2. In the following description, the MFPs 231 and 232 are designated as an MFP 400.

As shown in FIG. 4, the MFP 400 is comprised of a CPU 401 that executes programs stored in a ROM 402 or a hard disk (hereinafter referred to as "the HD") 411 and collectively controls devices connected to a system bus 404. The devices connected to the system bus 404 are the CPU 401, the ROM 402, a RAM 403, a panel controller 405, a display controller 406, a disk controller 407, a network interface card 406, and a timer 412. An operation panel 409, a display 410, and the HD 411 are connected to the keyboard controller 405, the display controller 406, and the disk controller 407, respectively.

The RAM 403 functions as a main memory, a working area, and so on for the CPU 401. The panel controller 405 forwards numeric values and codes, which are input from the operation panel 409 provided in the MFP 400, to the CPU 401 via the system bus 404. The display controller 406 controls display on the display 410 comprised of, for example, a liquid crystal display. The disk controller 407 controls writing and reading of data to and from the HD 411. The network interface card 408 bidirectionally sends and receives data to and from the other devices via the LAN 201.

In the MFP 400, a program for constructing a track record client is stored. If the CPU 401 executes this program, a track record client is constructed.

Figure 5:
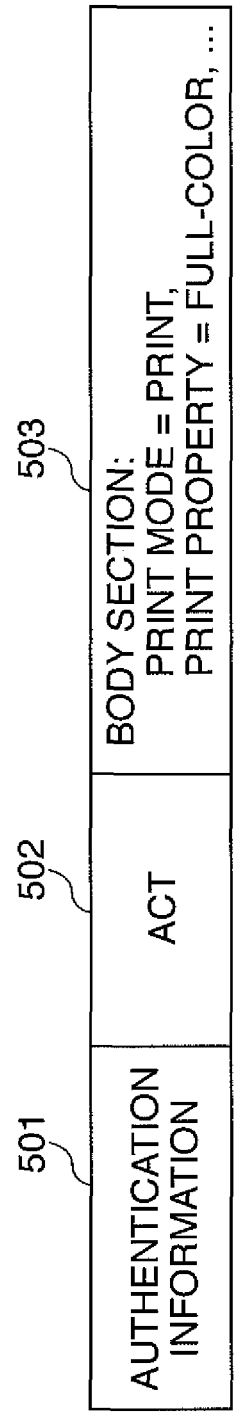
FIG. 5 is a diagram showing an example of a job created by the client PCs appearing in FIG. 2.

Referring next to FIG. 5, a description will be given of a job created by the clients 211 and 212 (printer drivers 103 and 110). FIG. 5 is a diagram showing an example of a job created by the clients 211 and 212 appearing in FIG. 2.

As shown in FIG. 5, a job is comprised of authentication information 501 indicative of a user who has issued the job, an ACT 502, and a body section 503 F indicative of the contents of an operation requested to be performed by an MFP. In the present embodiment, the job is a print job that requests full-color normal printing (printing in which scaling up/down, page layout, and so on are not performed).

Upon receiving the job, the MFP 104 compares a list of usable functions written in the ACT 502 of the received job and the contents of the operation written in the body section 503 with each other. If the contents of the operation are included in the list of the usable functions, the MFP 104 executes the job. On the other hand, if the contents of the operation are not included in the list of the usable functions, the MFP 104 cancels the job.

Figure 6:
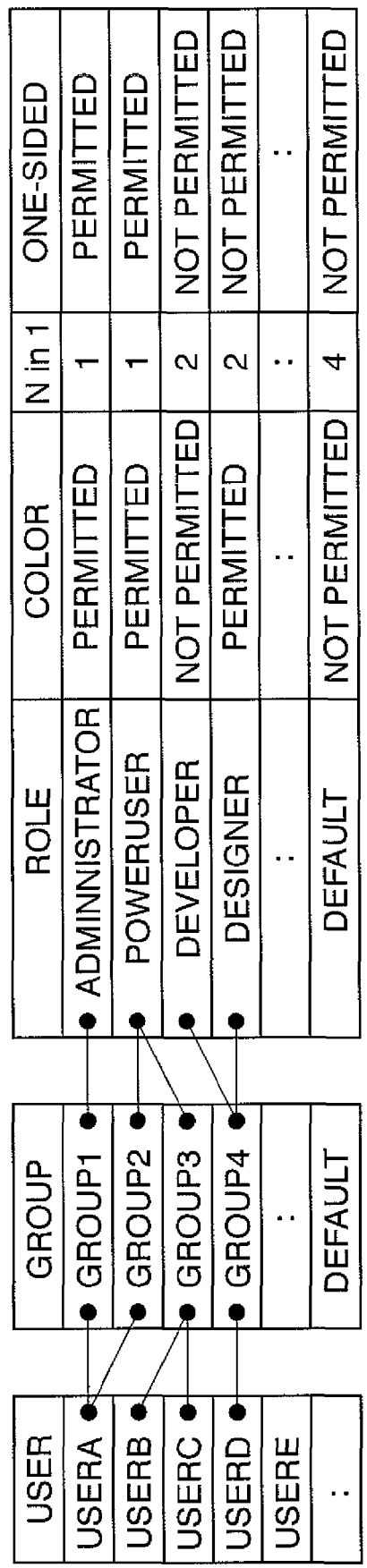
FIG. 6 is a diagram showing an example of the relationship between users and roles (operation rights)

Referring next to FIG. 6, a description will be given of the relationship among users, roles, and rights. FIG. 6 is a diagram showing an example of the relationship among users, roles, and rights.

In the present embodiment, as shown in FIG. 6, a user A belongs to a group 1 and a group 2; a user B and a user C, a group 3; a user D, a group 4; and a user E, no group. A role "Administrator" is assigned to the group 1. A role "PowerUser" is assigned to the groups 2 and 3. A role "Developer" and a role "Designer" are assigned to the group 4. No role is assigned to a group 5 and a default group. Here, the roles mean description of device-related operation rights assigned to the respective users.

In the present embodiment, the roles are provided with access information indicative of MFP operation rights, i.e. "Color", "Nin1", and "One-Sided", and each piece of access information is provided with a property indicative of a right thereof. For example, if the property of "Color" is set to "Permitted", color printing is permitted, and if the property of "Color" is set to "Not Permitted", only black-and-white printing is permitted.

Regarding the property of "Nin1", any of numeric values 1, 2, 4, 8, and 16 can be set as N. Here, pages smaller in number than a selected numeric value cannot be laid out on one side of print paper. Specifically, if the numeric value 1 is set, selection of all the properties of "Nin1" is permitted, and if the numeric value 8 is set, selection of only one of 8in1 or 16in1 is permitted. If the property of "One-sided" is set to "Permitted", both one-sided printing and double-sided printing are permitted, and if the property of "One-Sided" is set to "Not Permitted", only double-sided printing is permitted, and one-sided printing is not permitted, As mentioned above, a user can belong to one or more groups. If a user does not belong to any group, the user is automatically set to belong to a default group. Also, one or more roles can be assigned to a group. A default role is automatically set for a group to which no role is assigned. Thus, a role for a group to which a user belongs is applied to the user.

Pieces of information on users, groups, and roles are set by an administrator using a setting means operating on the restriction setting server 108 (FIG. 1), and the set pieces of information are stored in the user information server 101 (FIG. 1).

Referring next to FIG. 7, a detailed description will be given of the ACT 107. FIG. 7 is a diagram showing an example of the ACT 107.

As shown in FIG. 7 information 701 about a user who acquired the ACT 107 is written in the ACT 107. In the present embodiment, it is assumed that the user is "Taro", a role "Power User" is assigned to the user, and his mail address is "taro@xxx.yyy."

Also, information 702 about functions that can be used by the user who acquired the ACT 107 is written in the ACT 107. In the present embodiment, "PdLPrint" means that a function of performing printing from a PC can be used, "ColorPrint" means that color printing is permitted , and "Simplex" means that one-sided printing is not permitted.

Also, information 703 indicative of upper limits to the number of printed sheets that can be made using the MFP 104 by the user who has acquired the ACT 107 is written in the ACT 107. In the present embodiment, an upper limit to the total number of copies that can be made by color printing in the overall system is 1000, and an upper limit to the total number of copies that can be made by black-and-white printing in the overall system is 1000.

Figure 8:
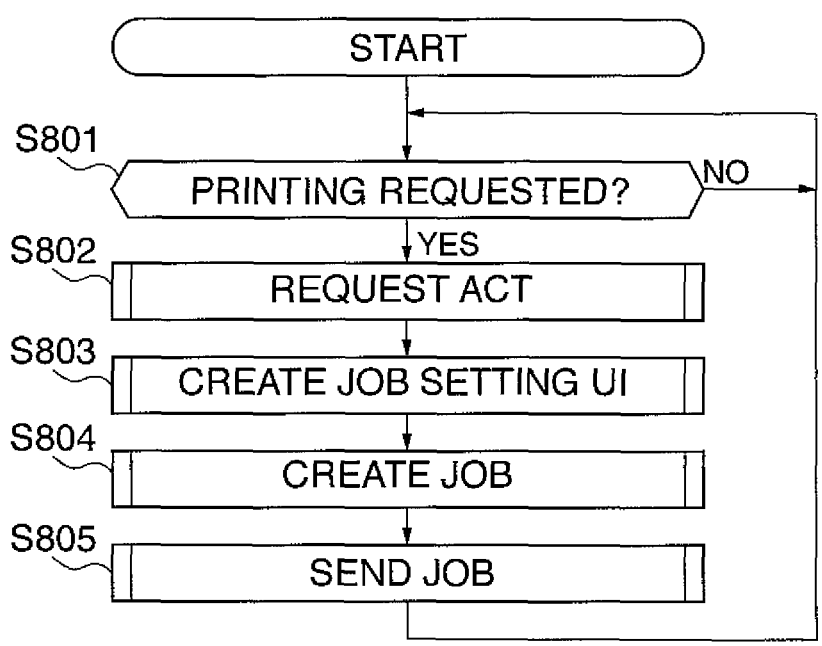
FIG. 8 is a flow chart showing the procedure of a process carried out by the client PCs (printer drivers) appearing in FIG. 2.

Referring next to FIG. 8, a description will be given of a process carried out by the client PCs. 211 and 212 (printer drivers 103 and 110) FIG. 8 is a flow chart showing the procedure of the process carried out by the client PCs 211 and 212 (printer drivers 103 and 110) appearing in FIG. 2. The procedure of the flow chart in FIG. 8 is carried out in accordance with a corresponding program by the CPU 301 of the client PC.

As shown in FIG. 8, the client PC waits for a printing request from a user (step S801). Upon receiving a printing request from a user, the client PC issues an ACT request to the ticketing server 102 (step S802). The ACT request includes information required to issue an ACT (for example, the name of a user who has requested printing). In response to the ACT request, the ticketing serer 102 issues an ACT, and the client PC receives the ACT issued by the ticketing server 102.

Then, the client PC creates a job setting UI (user interface) corresponding to the acquired ACT and displays the same (step S803). The print job setting UI reflects the contents of restrictions imposed on the user by the ACT. For example, if the property of "One-Sided" in the ACT is set to "Not Permitted", the print job setting UI is created which permits selection of only "Double-Sided Printing" in setting a printing finish. When the user sets "One-Sided Printing" using the print job setting UI, the setting is not permitted, and an error dialogue is displayed.

Then, the client PC creates a job using a job creating means provided in advance in the printer driver (step S804). Since the print job setting UI which conforms to the restrictions imposed on the user by the ACT is displayed in the step S803, the job created in accordance with a user's instruction is within limits imposed by the ACT. The client PC then sends the created job to the MFP using a procedure determined in advance (step S805). The client PC then returns to the step S801.

Figure 9:
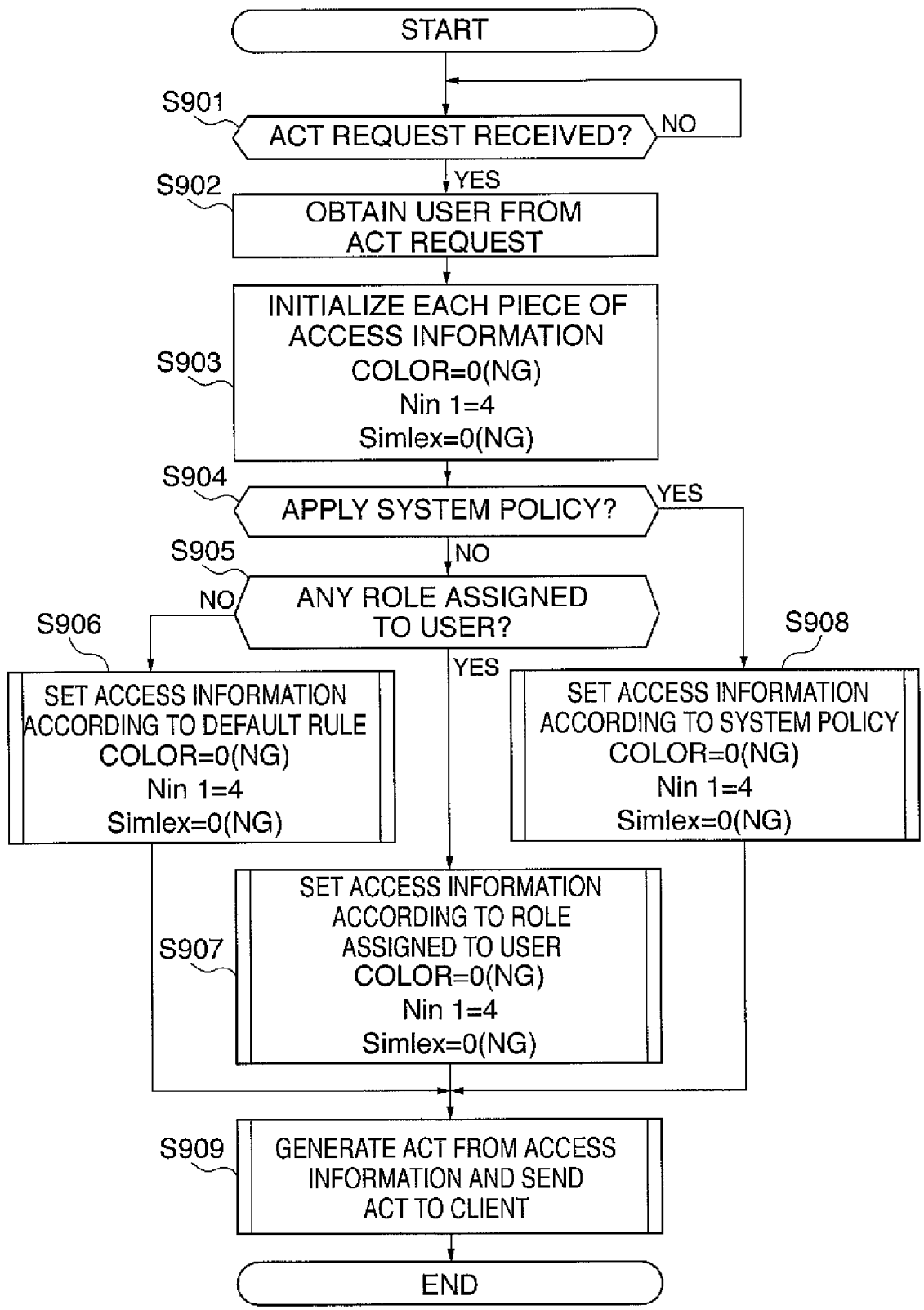
FIG. 9 is a flow chart showing the procedure of a process carried out by a ticketing server appearing in FIG. 1.

Referring next to FIG. 9, a description will be given of a process carried out by the ticketing server 102. FIG. 9 is a flow chart showing the procedure of the process carried out by the ticketing server 102. The procedure of the flow chart in FIG. 9 is carried out in accordance with a corresponding program by the CPU 301 of the ticketing server 102. For the convenience of explanation, it is assumed here that access information set in roles includes a color property (COLOR), a Nin1 property (Nin1), and a one-sided property (Simplex).

As shown in FIG. 9, first, the ticketing server 102 waits for an ACT request from the printer driver 103 (step S901). Upon receiving the ACT request, the ticketing server 102 analyzes the ACT request and acquires a user name posted from the client PC (step S902).

Then, the ticketing server 102 initializes access information (step S903). The set values of the color property, the Nin1 property, and the one-sided property held in the ticketing server 102 are cleared.

Then, the ticketing server 102 determines whether or not a system policy (specified restrictions) is applied to a user who requested an ACT (step S904). Here, the ticketing server 102 acquires system information held in the user information server 101 and analyzes the acquired information. The above determination is carried out based on the analysis result. The system policy is set using a system policy setting means (FIG. 10), described later, by an administrator, and a detailed description of the system policy will be given later.

If determining in the step S904 that the system policy (specified restrictions) is not applied to the user who has requested the ACT, the ticketing server 102 then determines whether or not a specific role is assigned to the user who has requested the ACT (step S905). Here, the ticketing server 102 acquires user information held in the user information server 101 to search for a group to which the user belongs and a role assigned to this group. The above determination is carried out based on the search result. The case where any specific role is not applied to the user means the case where a default role is applied to the user.

If determining in the step S905 that any specific role is not applied to the user who has requested the ACT, the ticketing server 102 sets pieces of access information in the default role acquired from the user information server 101 (step S906). Here, set values of the color property, the Nin1 property, and the one-sided property are stored in an area reserved in the RAM 303 in the step S903. In the present embodiment, the color property is set to 0 which means prohibition, the Nin1 property is set to 4 (which means that four pages are laid out on one side of print paper), and the one-sided property is set to 0 which means prohibition.

If determining in the step S905 that any specific role is applied to the user who has requested the ACT, the ticketing server 102 sets pieces of access information in the role assigned to the user, which has been acquired from the user information server 101 (step S907) Here, set values of the color property, the Nin1 property, and the one-sided property are stored in the RAM 303.

If determining in the step S904 that the system policy is applied to the user who has requested the ACT, the ticketing server 102 sets pieces of access information in the system policy acquired from the user information server 101 (step S908). Here, set values of the color property, the Nin1 property, and the one-sided property are stored in the RAM 303.

When pieces of access information are set in any of the steps S906 to S908, the ticketing server 102 creates an ACT in which the set pieces of access information are written as shown in FIG. 7. The created ACT is sent to the client PC, which has requested the ACT, using a procedure set in advance (step S909). The ticketing server 102 then terminates the present process.

In the above described way, the ticketing server 102 issues an ACT, in which operation rights (access information) set with respect to the user's MFP 231 are written, by referring to roles. If the application of a system policy is instructed, the ticketing server 102 issues an ACT in which user's device-related operation rights (access information) restricted according to the system policy are written. This ACT is sent to the client PC 211 or 212. Based on the ACT issued by the ticketing server 102, the client PC 211 or 212 permits operations on a device according to the user's operation rights. Specifically, the client PC 211 or 212 displays a user interface screen such as a print job setting user interface screen for making settings as to the operations permitted by the ACT.

Figure 10:
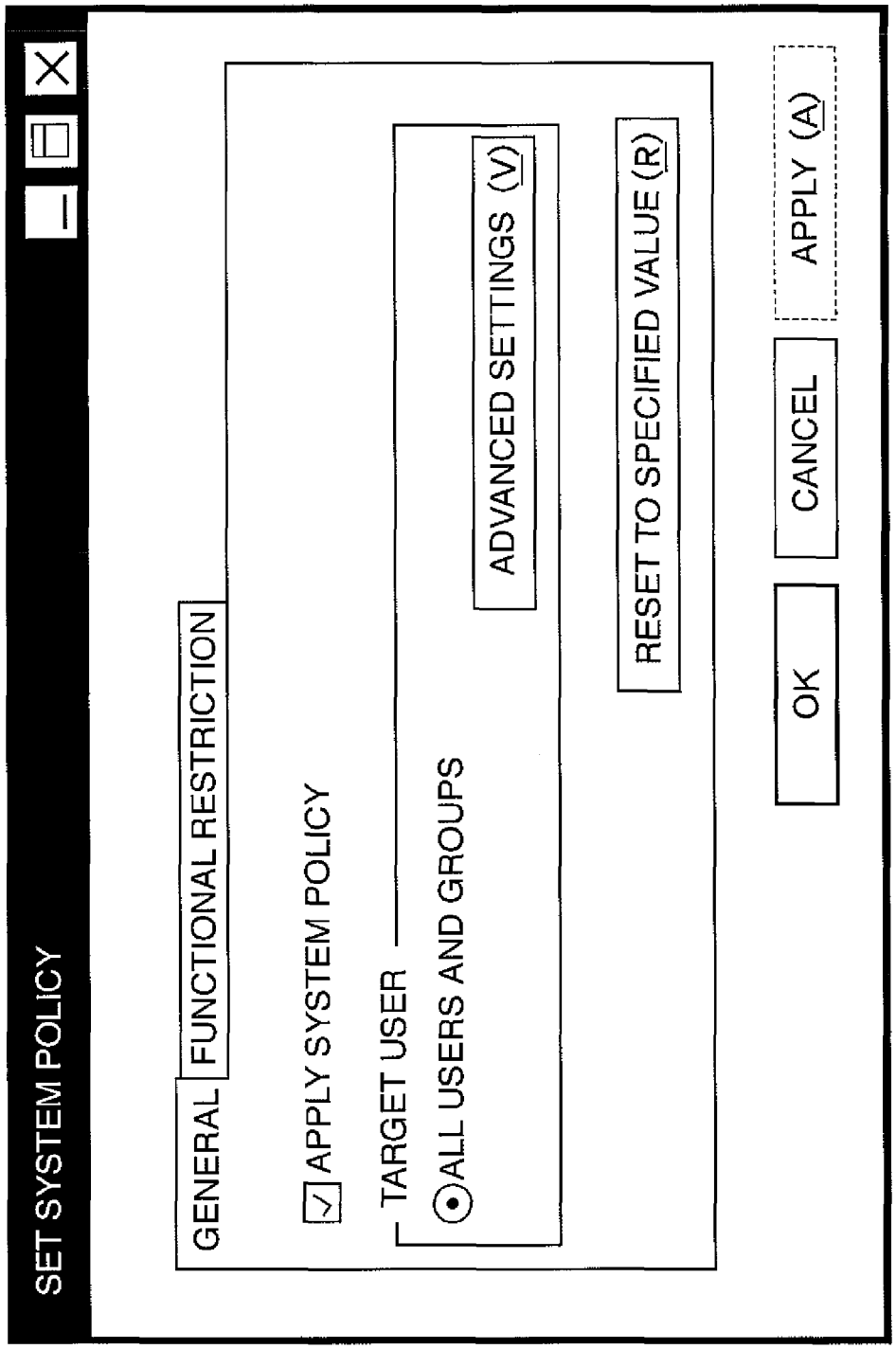
FIG. 10 is a view showing a system policy setting screen displayed by a system policy setting means provided in a restriction setting server appearing in FIG. 1.
Figure 11:
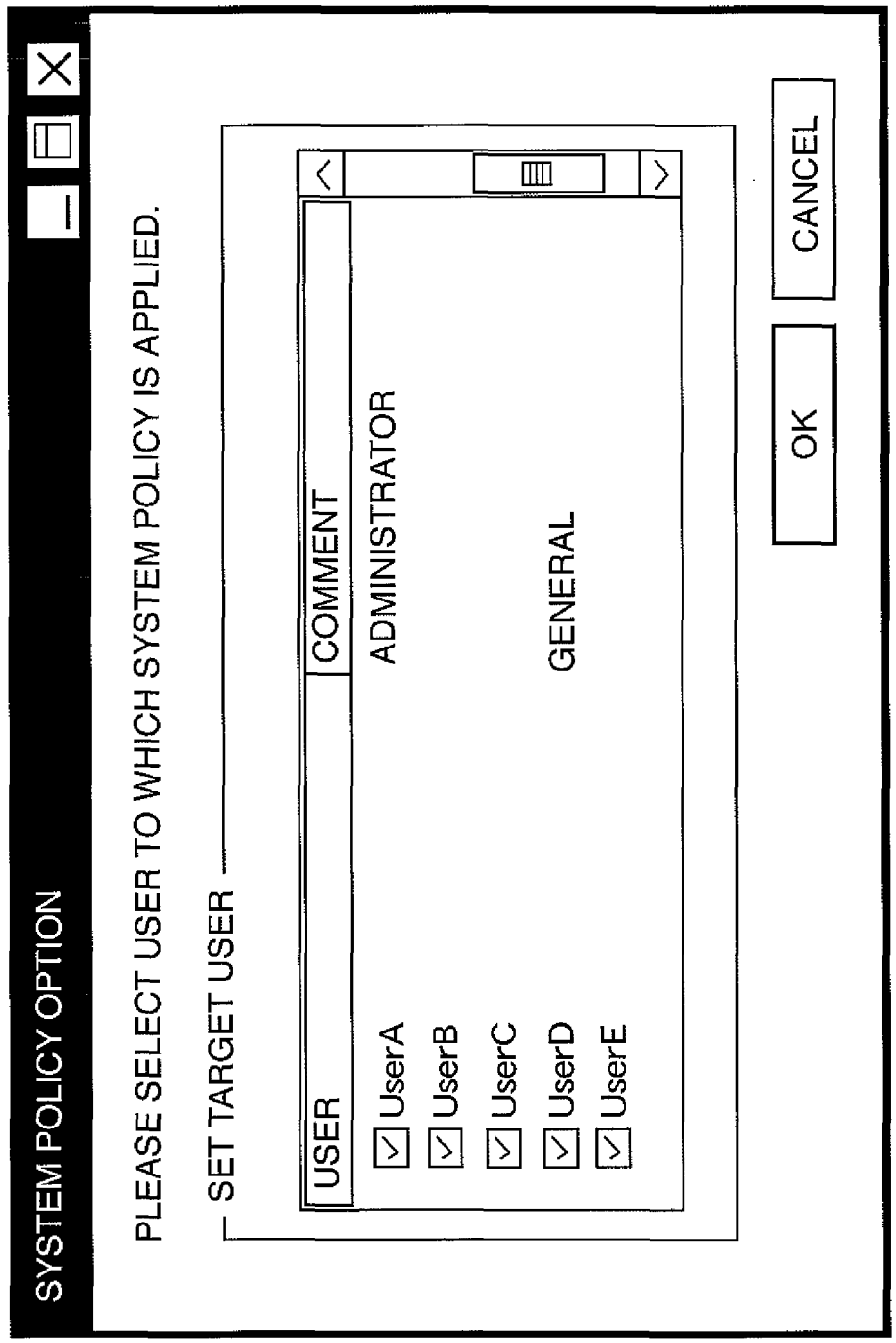
FIG. 11 is a view showing an example of a screen for setting users to which a system policy is to be applied.
Figure 12:
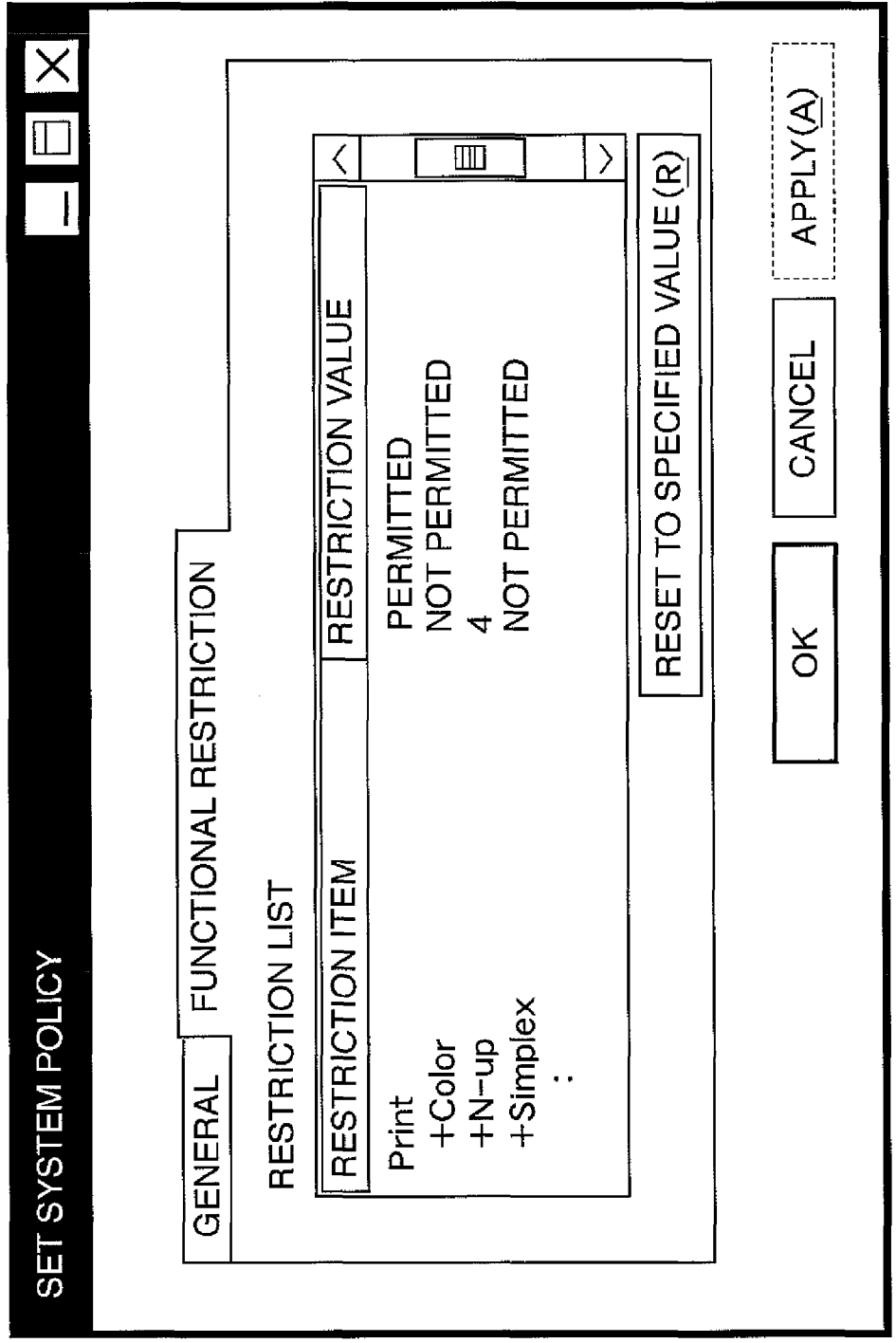
FIG. 12 is a view showing an example of a screen for setting functions to be restricted by a system policy.

Referring next to FIGS. 10 to 12, a description will be given of the system policy setting means provided in the restriction setting server 108. FIG. 10 is a view showing a system policy setting screen displayed by the system policy setting means provided in the restriction setting server appearing in FIG. 1. FIG. 11 is a view showing an example of a screen for setting users to which the system policy is to be applied. FIG. 12 is a view showing an example of a screen for setting functions to be restricted by the system policy.

Here, the system policy means specified restrictions which are applied to all the users joining in the present device management system and is intended to restrict user's operation rights. That is, in the present embodiment, the system policy is created so that operation rights of all the users can be restricted by giving the same access information to all the users.

In the restriction setting server 108, the system policy setting screen in FIG. 10 is displayed using the system policy setting means when an administrator determines the application of a system policy. When the administrator marks a checkbox "Apply System Policy" on the system policy setting screen, the application of the system policy is determined. If this checkbox is not marked, the system policy is not applied.

In the case where the checkbox "APPLY SYSTEM POLICY" is marked, and users to which the system policy is to be applied are all the users and groups, a checkbox "All Users And Groups" is marked.

It is also possible to individually set users to which the system policy is to be applied. In this case, an "Advanced Settings" button in a user area is depressed. In response to the depression of the "Advanced Settings" button, a screen for setting users to which the system policy is to be applied as shown in FIG. 11 is displayed. On this screen, a list of users registered in the system as well as comments are displayed, and checkboxes are provided for the respective users. Here, by marking checkboxes for corresponding users, the system policy is applied to the users. If the system policy is applied, the client PC displays a print job setting UI which conforms to functional restrictions imposed by the system policy, and functional restrictions in roles set for the respective users are not used. When setting of users to which the system policy is to be applied is completed, an OK button is depressed, and the settings are stored in the HD 311. When a Cancel button is depressed, the settings are canceled.

Also, on the screen in FIG. 10, "Functional Restrictions" tag for setting user's operation rights restricted by the system policy is displayed. When the "Functional Restrictions" tag is selected, a setting screen for setting function restrictions as shown in FIG. 12 is displayed. On this screen, a list of restriction items is displayed, and values are set for the respective restriction items. For example, with respect to restrictions on color printing, "Permitted" or "Not Permitted" can be set. The listed restriction items include all the items of operation rights in roles. Also, default values are prescribed as set values for the respective restriction items, and set values can be reset to the default values. In this case, a "Reset To Specified Value" button is displayed. When values are set for the respective restriction items as described above and the OK button is depressed, the set values for the restriction items are stored in the HD 311.

When settings as to whether or not the system policy is to be applied, users to which the system policy is to be applied, functional restriction items and set values thereof are completely made and the OK button is depressed on the screen in FIG. 10, the settings are stored in the HD 311. To cancel the settings, the Cancel button is depressed.

By setting and applying a system policy in desired timing as described above, the system administrator can restrict operation rights of desired users. The operation rights of the users to which the system policy is applied are restricted according to the system policy posted from the ticketing server 102, and jobs to be issued by the users are restricted to jobs conforming to the restrictions imposed by the system policy. Also, the system administrator can cancel the application of the system policy on the restriction information server 108 in desired timing. Thus, in desired timing, user's operation rights can be easily reset to operation rights specified in roles.

As described above, according to the present embodiment, device-related operation rights assigned to respective users can be changed or reset promptly and easily.

Although in the above description of the present embodiment, it is assumed that user's operation rights with respect to an MFP are operation rights relating to printing functions (such as rights relating to permission of usage of the following functions: color printing, Nin1 page layout, and one-sided printing), this is not limitative. An operation right relating to a copy function, an operating function relating to a sending function, and so on may be set as user's operation rights with respect to an MFP.

Figure 13:
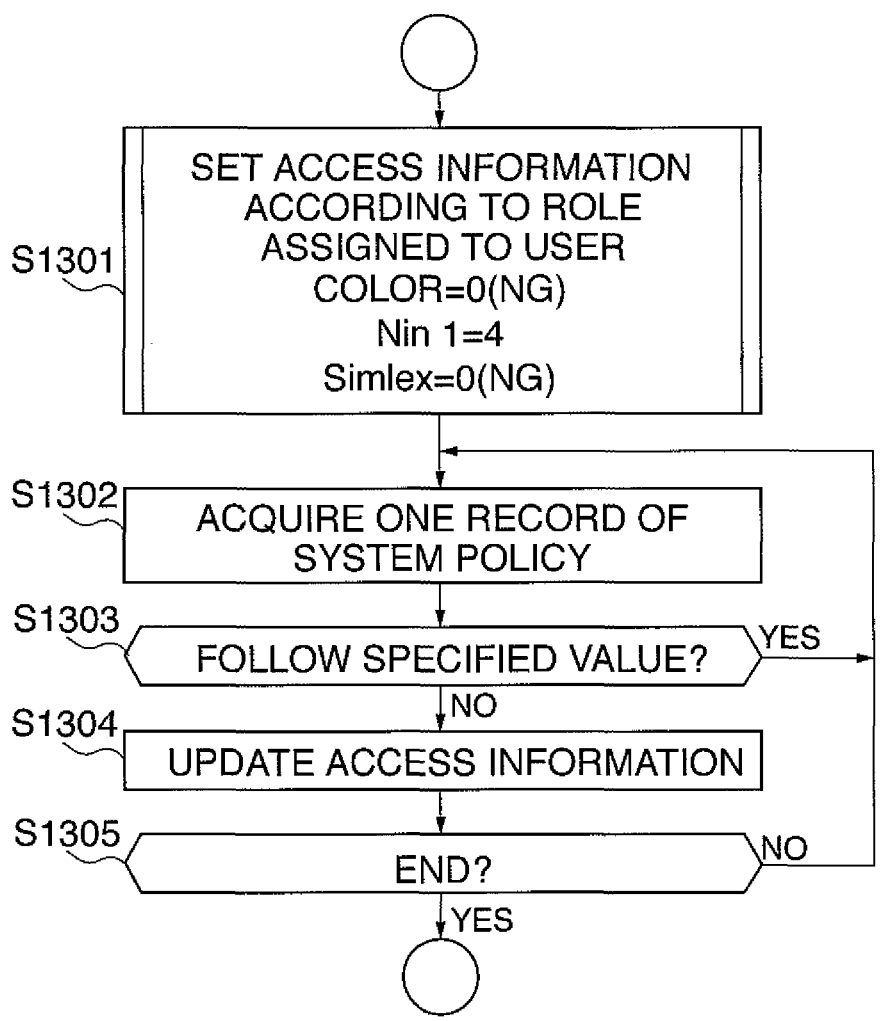
FIG. 13 is a flow chart showing the procedure of a process carried out by a ticketing server of a device management system according to a second embodiment of the present invention.

Referring next to FIG. 13, a description will be given of a second embodiment of the present invention. FIG. 13 is a flow chart showing the procedure of a process carried out by a ticketing server of a device management system according to the second embodiment.

The present embodiment is identical in construction with the first embodiment described above, and therefore description thereof is omitted. In the following description of the present embodiment, the same reference numerals as those of the first embodiment are used. Only points of differences between the present embodiment and the first embodiment will be described below. Specifically, the present embodiment differs from the first embodiment in a method of setting values of respective restriction items in a system policy using the restriction setting server 108, and the procedure of a process carried out by the ticketing server 102.

First, regarding the method of setting values of respective restriction items in a system policy using the restriction setting server 108, "Follow Specified Value" can be set as set values of respective restriction items. In the case of a restriction item for which "Follow Specified Value" is set, a set value corresponding to a role assigned to a user is used as a set value for this restriction item. For example, assume that a set value for color printing in a role assigned to a user is "0", and "Follow Specified Value" is set with respect to a restriction on color printing in a system policy. In this case, the set value "0" in the role assigned to the user is used as a set value for a restriction on color printing.

As "Follow Specified Value" can be set, the step S908 (FIG. 9) carried out by the ticketing server 102 is replaced by a process in FIG. 13.

If determining that a system policy is applied (YES to the step S904 in FIG. 9), the ticketing server 102 starts carrying out the process in FIG. 13. First, the ticketing server 102 sets pieces of access information for a role assigned to a user acquired form the user information server 101 (step S1301). Here, the pieces of access information are comprised of set values of the color property, the Nin1 property, and the one-sided property.

Next, the ticketing server 102 acquires a system policy from the user information server 101 and reads one record of the acquired system policy (step S1302). Then, the ticketing server 102 determines whether or not "Follow Specified Value" is set for the read record (step S1303).

If determining in the step S1303 that "Follow Specified Value" is set for the read record, the ticketing server 102 returns to the step S1032 to read the next record. On the other hand, if determining in the step S1303 that "Follow Specified Value" is not set for the read record, the ticketing server 102 acquires set values from the acquired record (step S1304). Then, the ticketing server 102 updates corresponding set values among the set values set in the step S1301 to the acquired set values.

Next, the ticketing server 102 determines whether or not reading of all the records has been completed (step S1305). If reading of all the records has not yet been completed, the ticketing server 102 returns to the step S1302. On the other hand, if reading of all the records has been completed, the ticketing server 102 goes to the step S909 in FIG. 9.

As described above, according to the present embodiment, by making it possible to set "Follow Specified Value" in a system policy, it is possible to set items on which restrictions are to be imposed and items on which no restrictions are to be imposed among function restriction items with respect to a desired user so that they can be easily discriminated from each other.

Figure 14:
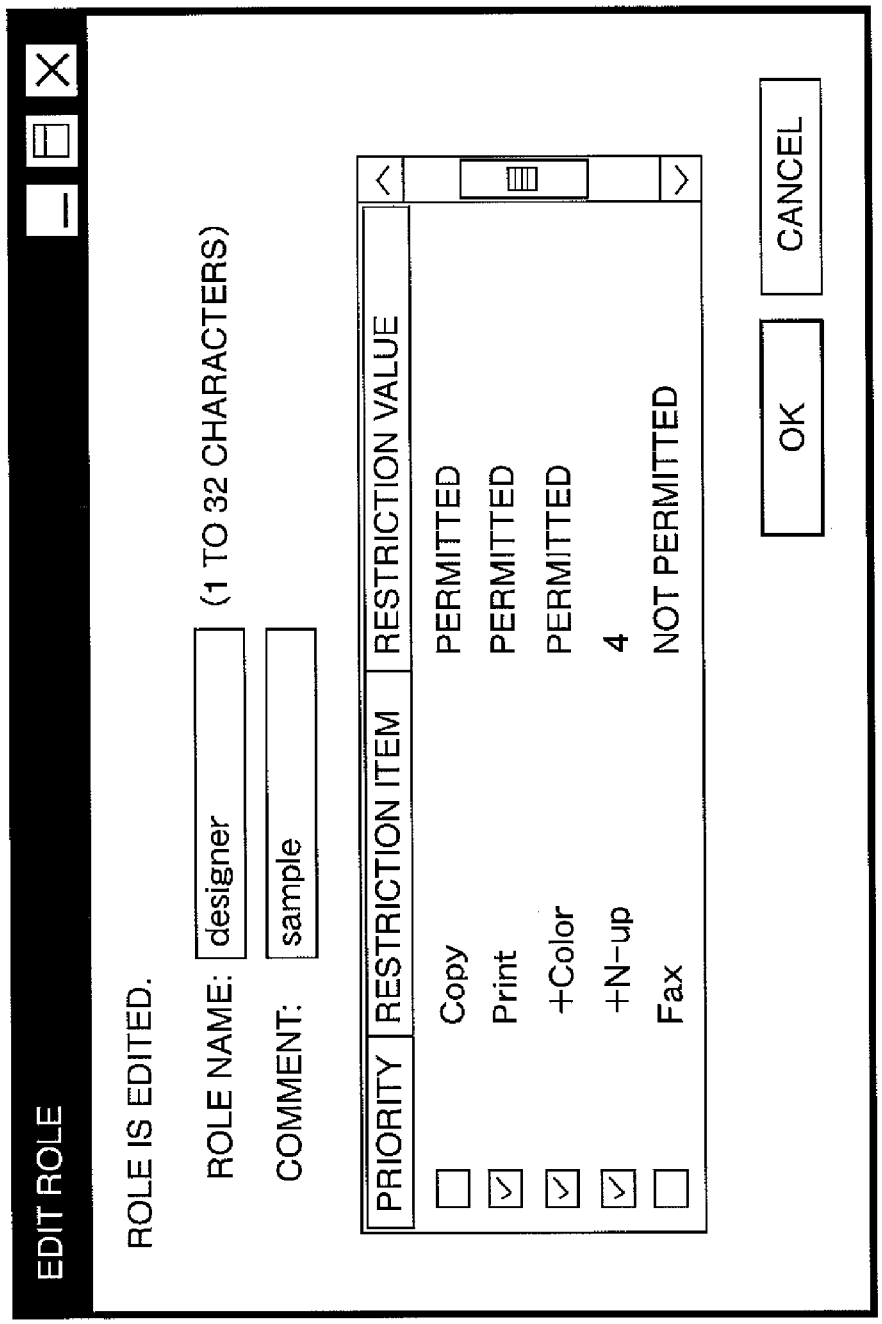
FIG. 14 is a view showing an example of a role editing screen displayed on a restriction setting server of a device management system according to a third embodiment of the present invention.

Referring next to FIGS. 14 and 15, a description will be given of a third embodiment of the present invention. FIG. 14 is a view showing an example of a role editing screen displayed in a restriction setting server of a device management system according to the third embodiment. FIG. 15 is a flow chart showing the procedure of a process carried out by a ticketing server of the device management system according to the third embodiment.

The present embodiment is identical in construction with the first embodiment described above, and therefore description thereof is omitted. In the following description of the present embodiment, the same reference numerals as those of the first embodiment are used.

In the present embodiment, in the case where a plurality of roles are assigned to a user whose operation rights are desired to be restricted, his/her operation rights can be restricted by modifying one of the roles.

Specifically, there is provided a means for setting priorities with respect to items of access information in a desired one of a plurality of roles when an administrator edits roles in the restriction setting server 108. Each priority is indicative of whether or not a set value of a role is given a higher priority over other set values of the role. There are two levels of priorities, "High" and "Low", and a "High" priority means hat the highest priority is given to a set value for which this priority is set.

Specifically, a role editing screen as shown in FIG. 14 is displayed when an administrator edits roles in the restriction setting server 108. On the role editing screen, an input box for a role name and an input box for a comment are displayed. If the role name typed in the input box is the name of an existing role, a list of restriction items described in the role having this name is displayed, and also, priorities and set values designated for the respective restriction items are displayed. Regarding the priorities, if a priority checkbox is marked, a value "1" indicative of a "High" priority is set, and if a priority checkbox is not marked, a value "0" indicative of a "Low" priority is set. On the role editing screen, priorities and set values are modified as necessary.

If no role corresponds to the role name typed in the role name input box, i.e. if a new role is to be registered, a list of restriction items is displayed. Then, priorities and set values are input for the respective restriction items. In this manner, a new role can be created. The new role thus created is assigned to an associated user.

The role modified or newly created as described above is forwarded to the user information server 101, which in turn stores the received role.

Referring next to FIG. 15, a description will be given of a process carried out by the ticketing server 102. For the convenience of explanation, it is assumed here that access information set in roles are a color property (COLOR), a Nin1 property (Nin1), and a one-sided property (Simplex).

As shown in FIG. 15, first, the ticketing server 102 waits for an ACT request from the printer driver 103 (step S1601). Upon receiving the ACT request, the ticketing server 102 analyzes the ACT request and acquires a user name posted from the client PC (step S1602).

Then, the ticketing server 102 initializes access information (step S1603). Here, set values of the color property, the Nin1 property, and the one-sided property and priorities associated with the set values held in the ticketing server 102 are set to initial values. The priority with respect to the color property is expressed by "C_Priority", the priority with respect to the Nin1 property is expressed by "N_-Priority", and the priority with respect to the one-sided property is expressed by "S_Priority", and values thereof are set to "0" indicative of "Low."

Next, the ticketing server 102 acquires user information from the user information server 101 to acquire a group to which a user who has requested an ACT and all the roles assigned to the group (step S1604). Then, the ticketing server 102 retrieves one role from all the acquired roles, acquires pieces of access information set in the role and priorities associated with the respective pieces of access information, and stores the acquired access information and priorities in the RAM 303 (step S605).

Next, the ticketing server 102 compares the acquired priorities associated with the respective pieces of access information with priorities held in the RAM 303 and updates the pieces of access information according to the comparison result (step S1606). If, as a result of the comparison, the acquired priorities are higher than the priorities held in the RAM 303, the values of access information held in the RAM 303 are updated to the set values of the acquired access information.

Then, the ticketing server 102 determines whether or not the retrieval of all the acquired roles has been completed (step S1607) If the retrieval of all the acquired roles has not yet been completed, the ticketing server 102 returns to the step S1604 to retrieve the next role. On the other hand, if the retrieval of all the acquired roles has been completed, the ticketing server 102 creates an ACT in which the set pieces of access information are written as shown in FIG. 7, for example (step S1608). The created ACT is sent to the client PC which has requested the ACT using a procedure set in advance. Then, the ticketing server 102 terminates the present process.

As described above, according to the present embodiment, a system administrator can edit roles on the restriction information serer 108 so as to set a "High" priority with respect to a desired piece of access information in a specific role. Thus, in the case where a plurality of roles are assigned to a user whose operation rights are desired to be restricted, it is unnecessary to carry out an editing operation such as modification of all of the plurality of roles.

Also, since there is provided a button for resetting the priorities of a modified role to original priorities in resetting user's operation rights to original ones. Thus, priorities can be reset with ease.

As a result, device-related operation rights assigned to a user can be quickly and easily changed and reset.

The present invention may be applied to either a system or an integrated apparatus comprised of a plurality of apparatuses (for example, a scanner, a printer, and a network storage) or to a single apparatus.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, it is to be understood that the present invention may be applied to a case where a program code of software, which realizes the functions of any of the above described embodiments, is distributed from a storage medium in which the program code is stored to a person who requests the program code via a communication line such as a computer online service.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-152266 filed May 31, 2006, which is hereby incorporated by reference herein in its entirety.

What is claimed is:

1. A device management system that manages at least one device, comprising:
    an operation right setting unit adapted to set a first value for a particular operation right with respect to the device, the first value defining a first extent to which a first user can perform the particular operation right with respect to the device;
    an acquirement unit adapted to acquire information of the first user before the first user's operation of the device;
    an operation right restricting unit adapted to validate the information of the first user acquired by said acquirement unit and restrict the particular operation right with respect to the device for the first user according to the first value set by said operation right setting unit;
    a restrictive specification setting unit adapted to set a restrictive specification for restricting the particular operation right with respect to the device for a plurality of specific users which join in the device management system, the restrictive specification defining a second value for the particular operation right to be commonly applied for the plurality of specific users, the second value defining a second extent to which the plurality of specific users can perform the particular operation right, the second extent being a same or lesser extent than the first extent, and the restrictive specification, even when set, allowing the plurality of specific users to perform a printing operation with the device, wherein the restrictive specification setting unit is adapted to present a user-interface via a display device, the user-interface including a selectable option adapted to allow an administrative user to selectively apply the restrictive specification for the plurality of specific users;
    a determination unit adapted to determine whether the restrictive specification is to be applied for the plurality of specific users including the validated first user based on whether the selectable option is selected; and
    a storage unit adapted to store a default value for the particular operation right with respect to the device based on a default role reserved for users in the plurality of specific users that are not assigned to any other roles,
    wherein said operation right restricting unit is adapted to restrict the particular operation right with respect to the device for at least one of the users in the plurality of specific users that is not assigned to any other roles according to the default value stored by said storage unit,
    wherein said operation right restricting unit is adapted to temporarily restrict the particular operation right with respect to the device for the plurality of specific users according to the second value defined by the restrictive specification by overriding, based on the restrictive specification, at least the first value set by said operation right setting unit for the particular operation right when it is determined that the restrictive specification is to be applied, the temporary restricting occurring while the selectable option is selected,
    wherein the operation right setting unit is adapted to set a different value different than the first value for the particular operation right for at least one of the plurality of specific users other than the validated first user,
    wherein the first value, the second value, the default value, and the different value are of a same data type,
    wherein the operation right setting unit is adapted to retain the first value, the default value, and the different value while the operation right restricting unit temporarily restricts the particular operation right according to the second value,
    wherein the operation right restricting unit is adapted to return to restricting the particular operation right with respect to the device for the validated first user according to the retained first value when the temporary restriction of the particular operation right according to the second value is complete, and
    wherein the units are implemented at least in part by one or more computers included within the system.

2. A device management apparatus that manages at least one device, comprising:
    an operation right setting unit adapted to set a first value for a particular operation right with respect to the device, the first value defining a first extent to which a first user can perform the particular operation right with respect to the device;
    an acquirement unit adapted to acquire information of the first user before the first user's operation of the device;
    an operation right restricting unit adapted to validate the information of the first user acquired by said acquirement unit and restrict the particular operation right with respect to the device for the first user according to the first value set by said operation right setting unit;
    a restrictive specification setting unit adapted to set a restrictive specification for restricting the particular operation right with respect to the device for a plurality of specific users which join in the device management system, the restrictive specification defining a second value for the particular operation right to be commonly applied for the plurality of specific users, the second value defining a second extent to which the plurality of specific users can perform the particular operation right, the second extent being a same or lesser extent than the first extent, and the restrictive specification, even when set, allowing the plurality of specific users to perform a printing operation with the device, wherein the restrictive specification setting unit is adapted to present a user-interface via a display device, the user-interface including a selectable option adapted to allow an administrative user to selectively apply the restrictive specification for the plurality of specific users;

a determination unit adapted to determine whether the restrictive specification is to be applied for the plurality of specific users including the validated first user based on whether the selectable option is selected; and a storage unit adapted to store a default value for the particular operation right with respect to the device based on a default role reserved for users in the plurality of specific users that are not assigned to any other roles, wherein said operation right restricting unit is adapted to restrict the particular operation right with respect to the device for at least one of the users in the plurality of specific users that is not assigned to any other roles according to the default value stored by said storage unit, wherein said operation right restricting unit is adapted to temporarily restrict the particular operation right with respect to the device for the plurality of specific users according to the second value defined by the restrictive specification by overriding, based on the restrictive specification, at least the first value set by said operation right setting unit for the particular operation right when it is determined that the restrictive specification is to be applied, the temporary restricting occurring while the selectable option is selected, wherein the operation right setting unit is adapted to set a different value different than the first value for the particular operation right for at least one of the plurality of specific users other than the validated first user, wherein the first value, the second value, the default value, and the different value are of a same data type, wherein the operation right setting unit is adapted to retain the first value, the default value, and the different value while the operation right restricting unit temporarily restricts the particular operation right according to the second value, wherein the operation right restricting unit is adapted to return to restricting the particular operation right with respect to the device for the validated first user according to the retained first value when the temporary restriction of the particular operation right according to the second value is complete, and wherein the units are implemented at least in part by one or more computers within the apparatus.

3. A device management apparatus according to claim 2, further comprising a user designating unit adapted to designate users to which the restrictive specification is to be applied.

4. A device management apparatus according to claim 2, wherein the restrictive specification is adapted to designate users whose device-operated operation rights therewith assigned to respective users are given priority.

5. A device management apparatus according to claim 2, further comprising:

a holding unit adapted to hold a plurality of tables in which device-related operation rights and priorities associated therewith assigned to respective users are written; and a priority changing unit adapted to change the priorities associated with the operation rights in the plurality of tables, wherein, in setting operation rights of a user who requests operation of the device, said operation right setting unit is adapted to refer to the table assigned to the user to set operation rights with high priorities as the operation rights of the user who requests operation of the device.

6. A device management apparatus according to claim 2, wherein in a case where it is determined that the restrictive specification is to be applied, said operation right restricting unit is adapted to issue a device usage permission including user's operation rights right with respect to the device restricted based on the restrictive specification.

7. A device management method of managing at least one device, the method implemented at least in part by one or more computers in a device management system, and the method comprising:

an operation right setting step of setting a first value for a particular operation right with respect to the device, the first value defining a first extent to which a first user can perform the particular operation right with respect to the device;

an acquirement step of acquiring information of the first user before the first user's operation of the device;

an operation right restricting step of validating the information of the first user acquired in said acquirement step and restricting the particular operation right with respect to the device for the first user according to the first value set in said operation right setting step;

a restrictive specification setting step of setting a restrictive specification for restricting the particular operation right with respect to the device for a plurality of specific users which join in the device management system, the restrictive specification defining a second value for the particular operation right to be commonly applied for the plurality of specific users, the second value defining a second extent to which the plurality of specific users can perform the particular operation right, the second extent being a same or lesser extent than the first extent, and the restrictive specification, even when set, allowing the plurality of specific users to perform a printing operation with the device, wherein, in the restrictive specification setting step, a user-interface is presented via a display device, the user-interface including a selectable option adapted to allow an administrative user to selectively apply the restrictive specification for the plurality of specific users;

a determination step of determining whether the restrictive specification is to be applied for the plurality of specific users including the validated first user based on whether the selectable option is selected; and a storage step of storing in a storage unit a default value for the particular operation right with respect to the device based on a default role reserved for users in the plurality of specific users that are not assigned to any other roles, wherein said operation right restricting step includes restricting the particular operation right with respect to the device for at least one of the users in the plurality of specific users that is not assigned to any other roles according to the default value stored in said storage unit, wherein said operation right restricting step temporarily restricts the particular operation right with respect to the device for the plurality of specific users according to the second value defined by the restrictive specification by overriding, based on the restrictive specification, at least the first value set in said operation right setting step for the particular operation right when it is determined that the restrictive specification is to be applied, the temporary restricting occurring while the selectable option is selected, wherein the operation right setting step sets a different value different than the first value for the particular operation right for at least one of the plurality of specific users other than the validated first user, wherein the first value, the second value, the default value, and the different value are of a same data type, wherein the operation right setting step retains the first value, the default value, and the different value while the operation right restricting step temporarily restricts the particular operation right according to the second value, and wherein the operation right restricting step returns to restricting the validated user's particular operation right with respect to the device for the validated first user according to the retained first value when the temporary restriction of the particular operation right according to the second value is complete.

8. A device management method according to claim 7, further comprising a user designating step of designating users to which the restrictive specification is to be applied.

9. A device management method according to claim 7, wherein the restrictive specification is adapted to designate users whose device-operated operation rights therewith assigned to respective users are given priority.

10. A device management method according to claim 7, further comprising:
a holding step of holding a plurality of tables in which device-related operation rights and priorities associated therewith assigned to respective users are written; and
a priority changing step of changing the priorities associated with the operation rights in the plurality of tables,
wherein, in said operation right setting step, in setting operation rights of a user who requests operation of the device, the operation rights with high priorities are set as the operation rights of the user who requests operation of the device by referring to the table assigned to the user.

11. A device management method according to claim 7, wherein in said operation right restricting step, in a case where it is determined that the restrictive specification is to be applied, a device usage permission including user's operation rights right with respect to the device restricted based on the restrictive specification is issued.

12. A non-transitory computer-readable storage medium storing a program that, when executed by one or more computers in a device management system, causes the one or more computers to execute a device management method of managing at least one device, comprising:
an operation right setting module for setting a first value for a particular operation right with respect to the device, the first value defining a first extent to which a first user can perform the particular operation right with respect to the device;
an acquirement module for acquiring information of the first user before the first user's operation of the device;
an operation right restricting module for validating the information of the first user acquired by said acquirement module and restrict the particular operation right with respect to the device for the first user according to the first value set by said operation right setting module;
a restrictive specification setting module for setting a restrictive specification for restricting the particular operation right with respect to the device for a plurality of specific users which join in the device management system, the restrictive specification defining a second value for the particular operation right to be commonly applied for the plurality of specific users, the second value defining a second extent to which the plurality of specific users can perform the particular operation right, the second extent being a same or lesser extent than the first extent, and the restrictive specification, even when set, allowing the plurality of specific users to perform a printing operation with the device, wherein the restrictive specification setting module also is for presenting a user-interface via a display device, the user-interface including a selectable option adapted to allow an administrative user to selectively apply the restrictive specification for the plurality of specific users;
a determination module for determining whether the restrictive specification is to be applied for the plurality of specific users including the validated first user based on whether the selectable option is selected; and
a storage module for storing in a storage unit a default value for the particular operation right with respect to the device based on a default role reserved for users in the plurality of specific users that are not assigned to any other roles,
wherein said operation right restricting module further is for restricting the particular operation right with respect to the device for at least one of the users in the plurality of specific users that is not assigned to any other roles according to the default value stored by said storage unit,
wherein said operation right restricting module is for temporarily restricting the particular operation right with respect to the device for the plurality of specific users according to the second value defined by the restrictive specification by overriding, based on the restrictive specification, at least the first value set by said operation right setting module for the particular operation right when it is determined that the restrictive specification is to be applied, the temporary restricting occurring while the selectable option is selected,
wherein the operation right setting module sets a different value different than the first value for the particular operation right for at least one of the plurality of specific users other than the validated first user,
wherein the first value, the second value, the default value, and the different value are of a same data type,
wherein the operation right setting module retains the first value, the default value, and the different value while the operation right restricting module temporarily restricts the particular operation right according to the second value, and
wherein the operation right restricting module returns to restricting the particular operation right with respect to the device for the validated first user according to the retained first value when the temporary restriction of the particular operation right according to the second value is complete.

* * * * *